M. T. HOOPER.
CORN AND COTTON PLANTER.
APPLICATION FILED SEPT. 9, 1911.
1,029,125.
Patented June 11, 1912.
2 SHEETS—SHEET 2.
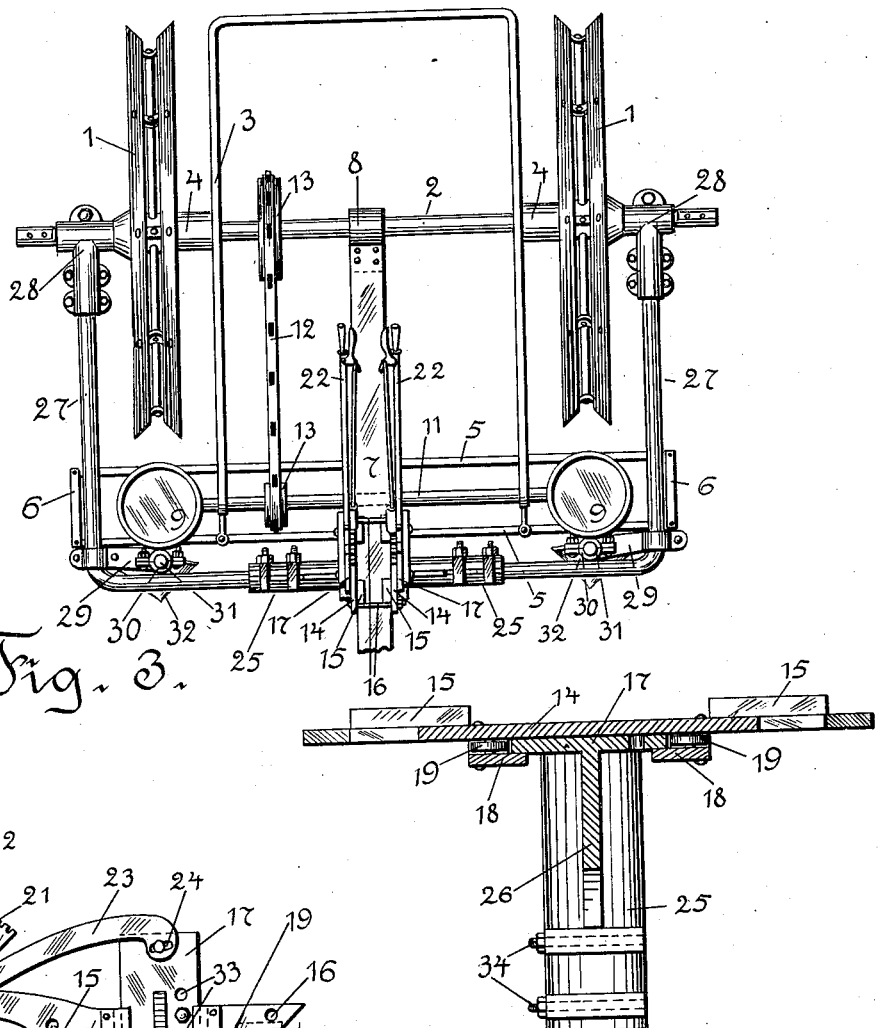
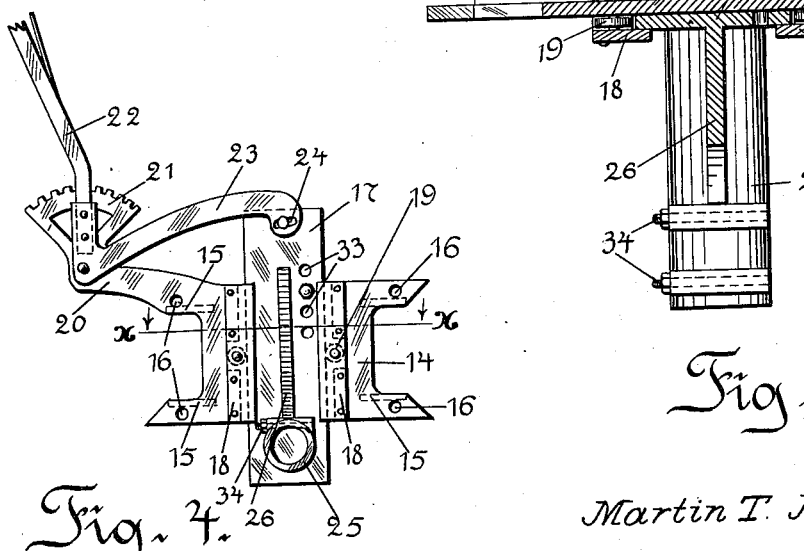
Martin T. Hooper.
INVENTOR

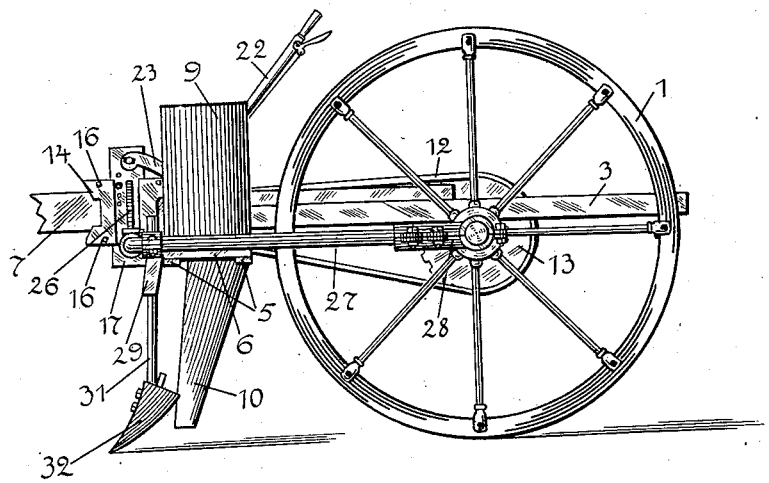

UNITED STATES PATENT OFFICE.

MARTIN T. HOOPER, OF MIDLAND, TEXAS.

CORN AND COTTON PLANTER.

1,029,125.   Specification of Letters Patent.   Patented June 11, 1912.

Application filed September 9, 1911. Serial No. 648,560.

*To all whom it may concern:*

Be it known that I, MARTIN T. HOOPER, a citizen of the United States, residing at Midland, in the county of Midland and State of Texas, have invented certain new and useful Improvements in Corn and Cotton Planters, of which the following is a specification.

My invention relates to new and useful improvements in corn and cotton planters, and relates more particularly to that class of planters which are adapted to plant two rows of seed simultaneously.

The object of the invention is to provide a corn and cotton planter equipped with a pair of plows one in front of each seed chute, to open furrows to receive the seed, said plows being adapted to undergo individual vertical adjustment, and being also adjustable with regard to the distance between them, so that the planter may be adjusted in accordance with the distance between any ordinary rows of seed.

A further object of the invention is to provide a corn and cotton planter of strong and durable construction, and provided with furrow opening plows that may be operated in a simple and efficient manner.

With these and various other objects in view, my invention has relation to certain novel features of the construction and operation, an example of which is described in the following specification and illustrated in the accompanying drawings, wherein:

Figure 1 is a side elevation of the herein described seed planter. Fig. 2 is a front view of the same. Fig. 3 is a plan view of the machine. Fig. 4 is a detail view, showing one of the lever mechanisms, of which two are employed to give individual vertical adjustment to the plows. Fig. 5 is a horizontal sectional view of the same, the section being taken upon the line $x$—$x$ of Fig. 4.

Referring now more particularly to the drawings, wherein like numerals of reference designate similar parts in all the figures, the numeral 1 denotes a pair of open-tire wheels rigidly mounted upon the extremities of an axle 2, and adapted to be adjusted in various positions upon said extremities. Between the two transporting wheels, a horizontal U-shaped frame 3 rests centrally upon the axle, being supported by a pair of bearings 4, one of which is attached to each of the parallel frame members. The forward extremities of the parallel members of the frame 3, serve to support an auxiliary frame at the front of the planter, consisting of a pair of transverse members 5, rigidly connected by members 6 at their extremities. The frame consisting of the members 5 and 6 is disposed symmetrically with respect to the tongue 7, which is mounted centrally of the machine in the usual manner, with its rear end pivotally attached to the axle, as indicated at 8. The auxiliary transverse frame, formed by the members 5 and 6, carries two seed cans or hoppers 9, positioned adjacent to the extremities of said frame, one in front of each transporting wheel. A seed chute 10 extends downwardly from each seed can at a slight forward inclination in the usual manner. A shaft 11 rotatably mounted upon the auxiliary frame, parallel to the members 5, is adapted to actuate the agitator mechanism within the two seed cans or hoppers, and also the valve mechanism not shown by which the seed is discharged from said cans at the proper periodic intervals. Rotation may be communicated to the shaft 11 from the axle of the machine by a chain 12 mounted upon a pair of sprocket gears 13.

A description will now be given of two similar frames, supporting plows, adapted to open furrows to receive the seed, and of mechanisms by which said frames may be subjected to individual vertical adjustment.

At each side of the tongue 7, just in front of the transverse auxiliary frame, is mounted a plate 14, each plate being provided upon its rear surface with four lugs 15, two of which are adapted to project above the tongue and two below the same. The two plates 14 are rigidly connected by four bolts 16, two of which are passed over the tongue, and two beneath the same. A rectangular plate 17, vertically elongated, is adapted to slide up and down upon the front surface of each plate 14, a pair of guides 18 being mounted integrally upon each of the plates 14 to direct the motion of the plates 17. A roller 19 is mounted at the center of each guide 18 between said guide and the plates 14, the rollers serving to reduce the friction arising between each of the plates 17 and its guides during vertical motion. From the upper portion of each plate 17, an integral arm 20 extends forwardly, each of said arms being surmounted by a quadrant 21. At the angular center of each quadrant is mounted the lower extremity of a lever 22, from which extremity there projects an arm 23 at approximately a right angle, the extremity of each arm having pivotal connection with the upper end of one of the plates 17. The usual means are provided to hold the levers 22 rigid with the quadrants 21 in any position of angular adjustment.

From the above description, it is apparent that a vertical displacement of either plate 17 may be effected by subjecting the correlated levers 22 to an angular displacement. Since the arm 23 swings in the arc of a circle during adjustment, the extremity of said arm must not be secured to the plate 17 by a simple pivotal fastening, as this fastening must be such as to permit some freedom of motion in a horizontal as well as in a vertical direction. For this reason the extremity of the arm 23 is provided with a slot 24 to receive the pin which forms the pivot connecting said arm to said plate. From each of the plates 17 a horizontal sleeve 25 projects outwardly at right angles, said sleeve being strengthened in its connection to the plate by a triangular web 26. Each of the sleeves 25 forms a socket to loosely receive the extremity of a pipe or round bar 27, each of which bars makes a right angled turn after projecting laterally a short distance, and extends rearwardly, the rear ends of the bars being pivotally connected to the axle extremities by two T's 28. The T's 28 are disposed adjacent to the wheels at the outside thereof, and may be adjusted to occupy various positions upon the axle. Upon each of the parallel portions of the two bars 27, there is rigidly clamped a bracket 29, adjacent to the bend at the forward extremity of the said member. The two brackets 29 project inwardly toward the tongue for a short distance, and carry upon their inner extremities sockets 30, which receive the vertical shanks 31 of a pair of plows 32, said plows being disposed one in front of each seed chute.

The manner of operation of the corn and cotton planter is obvious from the foregoing description. By means of the two similar lever mechanisms, the operator may readily adjust the depth of the seed receiving furrow cut by either of the two plows 32 without having to dismount from the machine, or make use of any tools. When either of the levers 22 is manually subjected to an angular displacement, the correlated plates 17 will be adjusted up or down according to the wish of the operator, thus correspondingly elevating or lowering the front end of the frame member 27, which has its extremity received by the sleeve 25 carried by said plate 17. The plows 32 are rigidly supported from the forward extremities of the two members 27, said plows will be affected by the same vertical adjustment that is imparted to the members 27. When the forward extremities of the members 27 are being vertically adjusted, the rear ends of said members will undergo a slight rotary motion upon the axle extremities. In order to compensate for the fact that the forward extremities of the members 27 tend to move in the arc of a circle, the center of which is located at the axle, while the sockets 25, which receive said forward extremities, move in a vertical line, the members 27 may be made to fit somewhat loosely in the sockets, or the connection between the members 27 and the T's 28 may be made a loose one, so that the members 27 may move slightly forward in the sockets to compensate for the vertical motion of their forward extremities. A plurality of bolt holes 33, vertically alined, is provided in the plates 17 at one side of the web 26. Any one of the bolt holes 33 may be made to receive a bolt passing through the plates 14, and over the tongue for the purpose of holding the correlated beam member 27 and plow members 32 in some certain position of vertical adjustment. The plates 17 will not be rigidly bolted in their place in this manner, unless the operator wishes to dispense with the levers 22. A pair of horizontal bolts 34 are transversely mounted upon the top of each sleeve 25, which bolts are sufficiently close to the axes of the sleeves to project slightly into the upper portion of the sleeve channels, so that when said bolts are in place, they will prevent the forward extremities of the members 27 from being displaced in said sleeve.

The seed planting parts shown in this application, such as the seed cans 9, the seed chutes 10, and the frame work supporting these parts with the mechanism to actuate the agitator and seed valves is not claimed as new, but the conjunction of the parts specified, with a pair of plows adapted to open seed receiving furrows, and adapted to be vertically adjusted individually, is presented as a novel feature, and all such changes and modifications of this feature as may be included within the scope of the following claims are presented as part of the present invention.

What I claim is:

1. In a corn and cotton planter, the combination with the wheels and axle thereof, of a seed can, a seed chute correlated with said can, a horizontal laterally projecting socket centrally mounted upon the forward portion of the machine and adapted to undergo vertical adjustment, a bar provided with a right angle bend, having one of its extremities received by said socket, and its other extremity pivoted upon one of the axle extremities, means for manually communicating vertical motion to said socket, and a plow rigidly supported upon said bar in front of the seed chute.

2. In a corn and cotton planter, the combination with the wheels and axle thereof, of a seed can, and a seed chute correlated with the seed can, a plate mounted upon the front part of the planter frame, provided with vertical guides, a plate adapted to undergo vertical adjustment in said guides, means for manually communicating vertical motion to said plate, a socket projecting rigidly in a lateral direction from said plate, a bar provided with a right angle bend, having its forward end received by said socket, and its rear end pivoted upon one of the axle extremities, rotatable means for reducing the friction due to vertical motion of said plate in its guides, and a plow rigidly supported from said bar, and positioned in front of the seed chute.

3. In a corn and cotton planter, the combination with the wheels and axle thereof, of a frame mounted upon said axle, an auxiliary frame transversely disposed in front of the first named frame, a seed can mounted upon the auxiliary frame at each extremity thereof, one in front of each transporting wheel, a seed chute depending from each seed can, a pair of sockets mounted at the front of the machine, adapted to undergo individual vertical adjustment, a pair of bars provided with a right angled bend, having their forward extremities received by said sockets, and their rear ends pivoted upon the axle extremities, and a pair of plows rigidly supported from said bars, one positioned in front of each seed chute.

In testimony whereof I have signed my name to this specification in the presence of two subscribing witnesses.

MARTIN T. HOOPER.

Witnesses:
J. HARVEY CLARK,
O. S. BURKETT.